(12) United States Patent
Cole

(10) Patent No.: US 9,203,893 B2
(45) Date of Patent: Dec. 1, 2015

(54) SYSTEM AND METHOD FOR INSTALLING DEVICE DRIVERS ON WELDING EQUIPMENT

(71) Applicant: LINCOLN GLOBAL, INC., City of Industry, CA (US)

(72) Inventor: Stephen Cole, Chula Vista, CA (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 63 days.

(21) Appl. No.: 13/789,945

(22) Filed: Mar. 8, 2013

(65) Prior Publication Data

US 2014/0258447 A1    Sep. 11, 2014

(51) Int. Cl.
*G06F 15/16* (2006.01)
*H04L 29/08* (2006.01)
*B23K 9/028* (2006.01)
*B23K 9/095* (2006.01)
*G06F 9/44* (2006.01)

(52) U.S. Cl.
CPC .............. *H04L 67/06* (2013.01); *B23K 9/0286* (2013.01); *B23K 9/0953* (2013.01); *G06F 9/4411* (2013.01)

(58) Field of Classification Search
CPC ........................ H04L 29/08072; H04L 29/06
USPC ........................................................ 709/217
See application file for complete search history.

(56) References Cited

U.S. PATENT DOCUMENTS

| 5,446,257 | A | * | 8/1995 | Sakamoto et al. | ........ 219/121.63 |
| 5,715,463 | A | * | 2/1998 | Merkin | .......... 717/175 |
| 5,764,916 | A | * | 6/1998 | Busey et al. | ................... 709/227 |
| 5,837,968 | A | * | 11/1998 | Rohrberg et al. | ........... 219/130.1 |
| 5,862,325 | A | * | 1/1999 | Reed et al. | ..................... 709/201 |
| 6,041,324 | A | * | 3/2000 | Earl et al. | ................................. 1/1 |
| 6,405,362 | B1 | * | 6/2002 | Shih et al. | ..................... 717/174 |
| 6,529,992 | B1 | * | 3/2003 | Thomas et al. | .................... 711/1 |
| 8,838,846 | B1 | * | 9/2014 | Tang et al. | ...................... 710/18 |
| 2002/0069353 | A1 | * | 6/2002 | Smith | ............... 713/1 |
| 2003/0051084 | A1 | * | 3/2003 | Rosen | ............................ 710/72 |

(Continued)

FOREIGN PATENT DOCUMENTS

EP    2372565 A1    10/2011
WO    WO 03012577 A2    2/2003

OTHER PUBLICATIONS

International Application No. PCT/IB2014/000266, International Search Report & Written Opinion, 8 pages, Jun. 24, 2014.

*Primary Examiner* — David X Yi
*Assistant Examiner* — Atta Khan
(74) *Attorney, Agent, or Firm* — Perkins Coie LLP

(57) ABSTRACT

A system and method for installing device drivers or application software on equipment used in brazing, cladding, building up, filling, hard-facing overlaying, joining or welding operations is provided. The system includes a first device and a second device. The first device and the second device communicate over a communication system to monitor and/or control the operations. The second device transmits device software (e.g., device drivers and/or application software) or a link to the device software to the first device over the communication system to facilitate the monitoring and/or controlling of the operations. In some embodiments, the first device, which can emulate a host, requests the device software from the second device after a determination that the device software needs to be uploaded. The second device can emulate a peripheral such as a disk drive, a serial port device, DVD drive, or a CD ROM.

20 Claims, 4 Drawing Sheets

(56) References Cited

U.S. PATENT DOCUMENTS

| | | | |
|---|---|---|---|
| 2004/0030809 A1* | 2/2004 | Lozano et al. | 710/8 |
| 2005/0240815 A1* | 10/2005 | Purkeypile et al. | 714/15 |
| 2006/0034234 A1* | 2/2006 | Watanabe | 370/338 |
| 2006/0064522 A1* | 3/2006 | Weigold et al. | 710/61 |
| 2006/0173619 A1* | 8/2006 | Brant et al. | 701/213 |
| 2007/0083356 A1* | 4/2007 | Brunet et al. | 703/23 |
| 2007/0267394 A1* | 11/2007 | Beck et al. | 219/130.5 |
| 2010/0213179 A1 | 8/2010 | Peters et al. | |
| 2011/0198328 A1* | 8/2011 | Casner | 219/125.1 |
| 2011/0309062 A1* | 12/2011 | O'Donnell et al. | 219/130.1 |
| 2012/0047295 A1* | 2/2012 | Wong | 710/50 |

\* cited by examiner

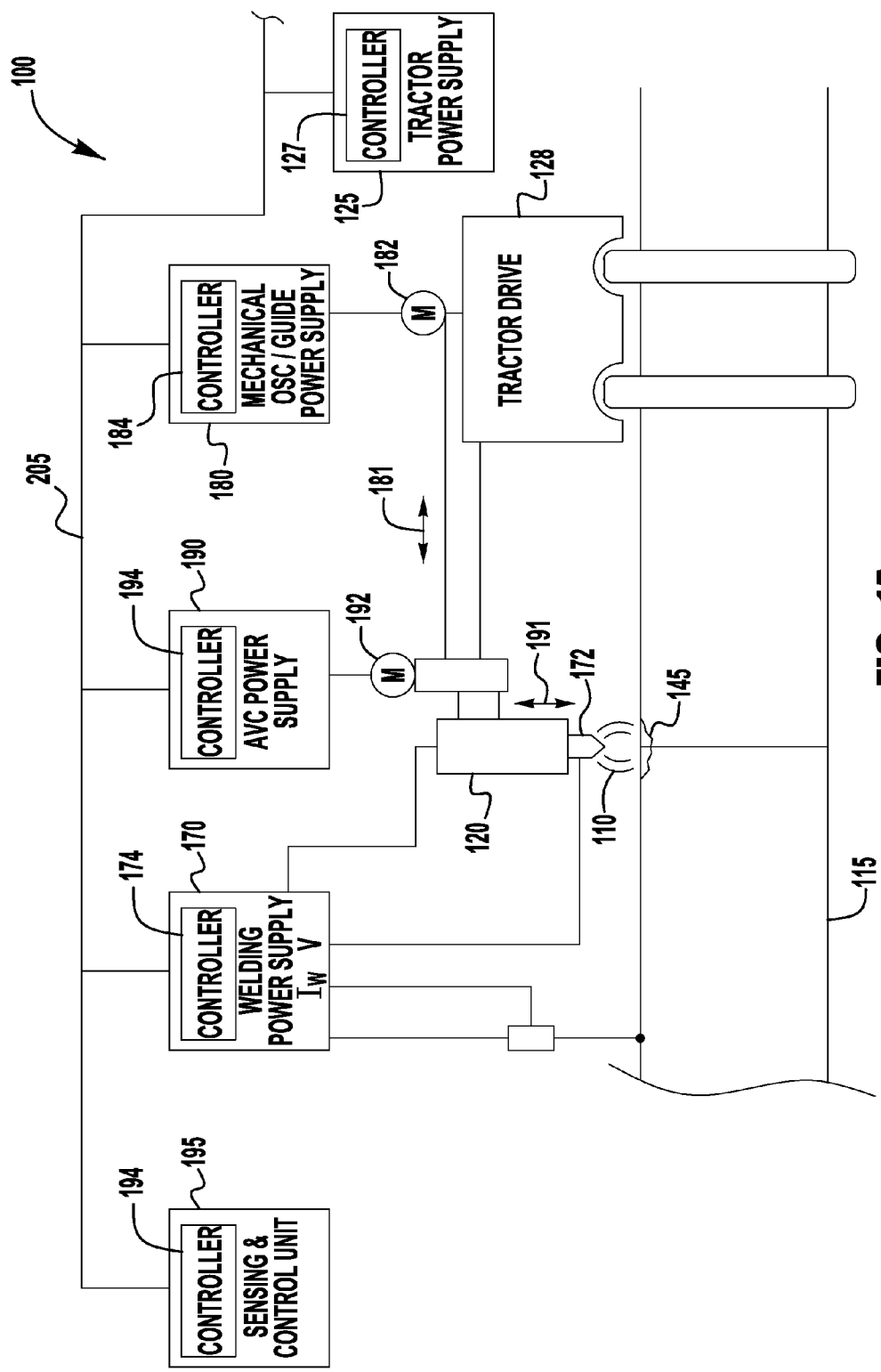

SYSTEM AND METHOD FOR INSTALLING DEVICE DRIVERS ON WELDING EQUIPMENT

TECHNICAL FIELD

Certain embodiments relate to systems, devices, and processes for any of brazing, cladding, building up, filling, hardfacing overlaying, joining and welding applications. More particularly, certain embodiments relate to automatically installing device drivers and/or application software on such devices.

BACKGROUND

Welding systems can have a number of various devices for performing and monitoring welding operations. In many cases, it would be desirable for the various devices to communicate with each other. For example, in gas-shielded tungsten arc welding (GTAW) systems, the system can include a power supply that supplies the welding current to the tungsten electrode and wire feeder to supply the consumable to the welding arc. In such systems, it can be beneficial for the welding power supply to know the wire feed speed in order to properly set the welding current to the tungsten electrode. Similarly, if the GTAW system is set up for hot wire welding process, it can be beneficial for the hot wire power supply to know the wire feed speed in order to properly set the heating current that resistance heats the feeder wire. Further, the above system can include motor drives to move the workpiece and/or the welding head as the welding progresses. In such cases, it can also be beneficial to start and stop the motor drives based on, e.g., whether the welding power supply is operating. Accordingly, communication between the various welding devices can promote efficient welding operation.

However, in order to communicate with external welding devices, especially PC based devices that use standard operating systems such as Windows, MAC, Unix, Linux, etc. (e.g., a monitoring and/or control device such as a PC, workstation, digital tablet, cell phone, etc.), each of these welding devices requires device drivers that use the same communication protocol as the other welding devices. Unfortunately, the device drivers may not be loaded or be at the same revision level across all the welding devices. Accordingly, unless all the welding devices are loaded with compatible device drivers, some or all of the devices may be unable to communicate with each other or the communications may be very inefficient. In addition, even if the welding device drivers are compatible, some welding devices may include application software and/or components of application software that need to be uploaded to the other welding devices before the system can work as designed. Typically, each welding device comes with its own set of disks (e.g., CD ROMS) that are loaded with device drivers and application software/components. An operator can then manually load the drivers/software onto the other welding devices. However, managing the device drivers and software for a plurality of welding devices can become cumbersome, especially if the disks are misplaced or located in a remote location. In addition, the operator may not know that device drivers/software were not loaded on a particular welding device until welding operations are set to resume, thereby causing delays and inefficiencies.

Further limitations and disadvantages of conventional, traditional, and proposed approaches will become apparent to one of skill in the art, through comparison of such approaches with embodiments of the present invention as set forth in the remainder of the present application with reference to the drawings. It is noted that although much of the following discussions will reference "welding" operations and systems, embodiments of the present invention are not just limited to joining operations, but can similarly be used for cladding, brazing, overlaying, etc.-type operations.

SUMMARY

The present invention includes a system and method for installing device drivers or application software on equipment used in brazing, cladding, building up, filling, hardfacing overlaying, joining or welding operations is provided. The system includes a first device and a second device that are used in the operations. The first device and the second device communicate over a communication system to monitor and/or control the operations. The second device transmits device software (e.g., device drivers and/or application software) or a link to the device software over the communication system to facilitate the monitoring and/or controlling of the operations. In some embodiments, the first device, which can emulate a host, requests the device software from the second device after a determination that the device software needs to be uploaded. The second device can emulate a peripheral such as a disk drive, a serial port device, DVD drive, or a CD ROM.

The method includes providing a first device and a second device that are used in the operations. The method also includes monitoring and/or controlling the operations over a communication system. The method further includes transmitting device software (e.g., device drivers and/or application software) or a link to the device software from the second device to the first device over the communication system to facilitate the monitoring and/or controlling of the operations.

In some embodiments, a welding system includes a first welding device and a second welding device. The first welding device and the second welding device are configured to communicate over a first communications channel to monitor and/or control welding operations. The second welding device is configured to transmit device drivers and/or application software to the first welding device on a second communication channel. The device drivers and application software facilitate the communication between the first welding device and the second welding device on the first communication channel.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which:

FIGS. 1A and 1B illustrate an exemplary arc welding system with welding devices that are consistent with the present invention;

DETAILED DESCRIPTION

Figure 1B:
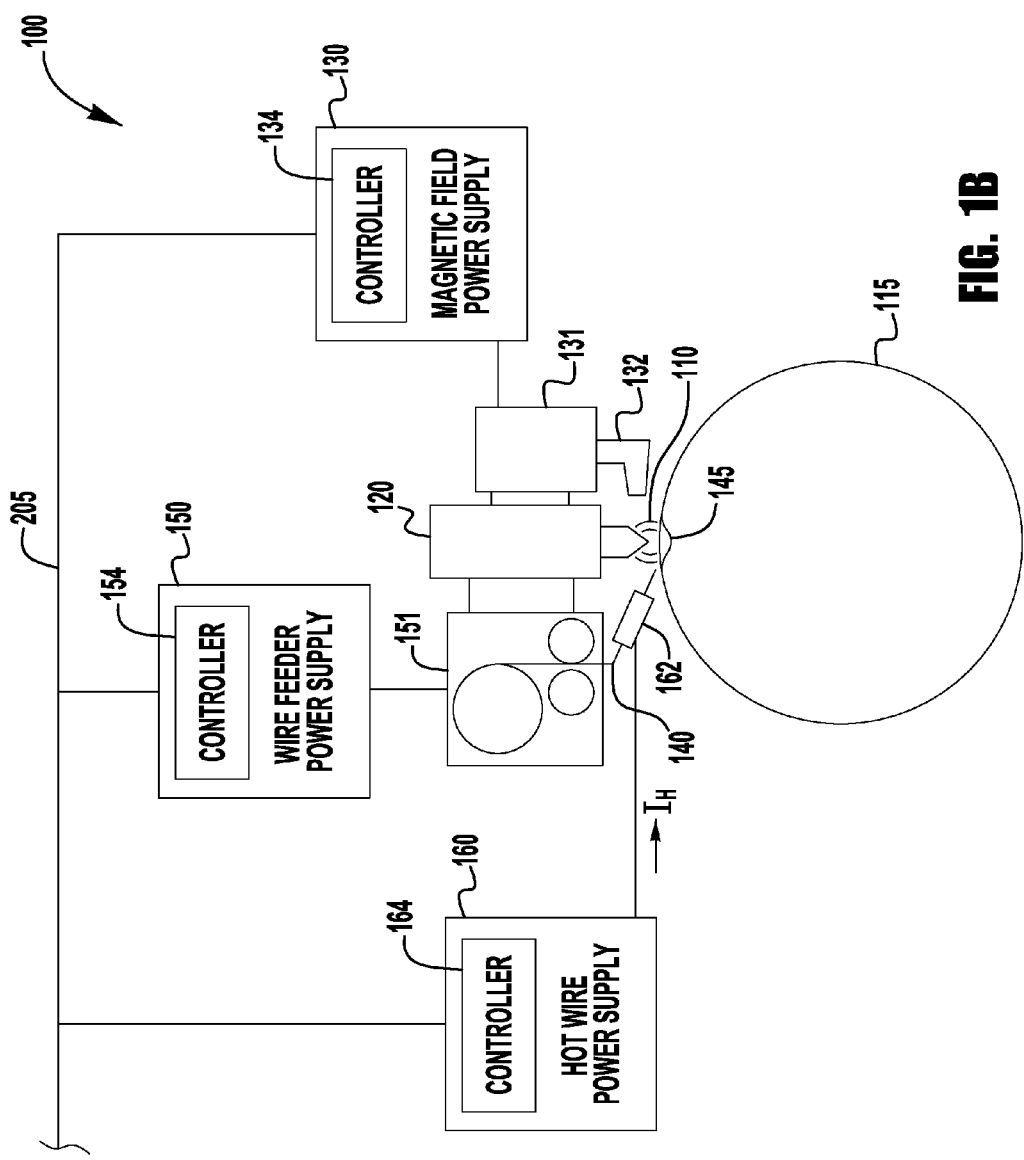

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1A illustrates an exemplary system 100 for welding/joining applications. The system 100 includes an arc welding system such as a GTAW system. Although a GTAW system is illustrated, the present invention will work with any system used for brazing, cladding, building up, filling, hard-facing overlaying, joining, and welding applications, including laser systems. As shown in FIG. 1A, the system 100 includes a GTAW power supply 170 that is operatively connected to tungsten electrode 172, which is housed in torch head 120. The welding power supply 170 can include a welding controller 174 that regulates the voltage, current, or power output from power supply 170. By controlling the voltage, current, or power output of power supply 170, a welding current is provided to workpiece 115 via electrode 172 and arc 110. The arc 110 heats workpiece 115 to create a weld puddle 145. The controller 174 can receive feedback signals such, e.g., the welding current ($I_W$) and/or the arc voltage (V) at the tip of torch 120, in order to regulate the output of power supply 170.

The system 100 can also include an arc voltage controller (AVC) system that includes a power supply 190 and an AVC motor 192. The AVC power supply 190 can include an AVC controller 194 that monitors the arc voltage (not shown) and adjusts the gap between the tip of electrode 172 and weld puddle 145 by using AVC motor 192 to move torch head 120 as shown by arrow 191. By adjusting the gap, the AVC system maintains the arc length within a desired range. The arc voltage can be received from an external source, e.g., the welding power supply 170, or can be independently monitored by the AVC controller 194.

In some embodiments, the system 100 can include a mechanical oscillation/guide system that includes a power supply 180 and oscillation/guide motor 182. The mechanical power supply 180 can include an oscillation/guide controller 184 that adjusts the position of the torch 120/electrode 172 with respect to the weld puddle 145. For example, in some embodiments, the oscillation/guide controller 184 can receive feedback from optical or mechanical seam trackers (not shown) to ensure that the electrode 172 is optimally positioned within the weld groove. In some embodiments, the oscillation/guide controller 184 can be configured to produce a weld weave pattern by oscillating the torch 120 back and forth during the welding process as shown by arrow 181. In such cases, the mechanical oscillation/guide controller 184 can receive the wire feed speed and/or the travel drive speed (not shown) as inputs in controlling the oscillation speed.

The system 100 can also include a tractor drive unit 128 that moves the welding system, i.e., the torch 120 and the attached welding devices. The tractor drive unit 128 is powered by tractor power supply 125. In FIG. 1A, the drive unit 128 is used in an orbital welding system for welding a pipe. However, the drive unit 128, or a similar drive unit, can be used in any automated welding system in which the welding head needs to be moved relative to a workpiece. In some systems, a drive unit can move the workpiece instead of the welding head. Turing back to FIG. 1A, the tractor power supply 125 includes a controller 127 that monitors and controls the travel speed of the drive unit 128 based on operator setpoints and/or welding conditions.

As illustrated in FIG. 1B, the welding system 100 can also include a wire feeder 151 that feeds filler wire 140 to the weld puddle 145. The wire feeder 151 is powered by a power supply 150. The wire feeder power supply 150 includes a feeder controller 154 that monitors and controls the wire feed speed of feeder 151. The controller 154 can also receive information such as wire size/type and/or inputs such as travel speed in order to control the wire feed speed. In some embodiments, the filler wire 140 can be resistance heated using current ($I_H$) supplied by hot wire power supply 160 via contact tube 162. The wire hot wire power supply 160 includes a hot wire controller 164 that monitors and controls the heating current ($I_H$) based on factors such as, e.g., wire feed speed, the temperature of the weld puddle 145, etc.

In addition, the system 100 can include a magnetic field system with magnetic field power supply 130, magnetic field generator 131, and magnetic field probe 132 to steer the arc 110 during the welding process. For example, the magnetic field generator 131, which is powered by magnetic power supply 130, can produce a magnetic field via magnetic field probe 132 that moves the arc 110 towards the probe 132 or away from it. The magnetic filed power supply 130 can include a magnetic field controller 134 that controls the intensity and polarity of the magnetic field being generated by the field generator 131. In some embodiments, the arc 110 can be oscillated to produce a desired weld weave pattern. Similar to the mechanical oscillation/guide controller 184 (see FIG. 1A), the magnetic field controller 134 can receive inputs such as wire feed speed and/or travel speed as inputs in order to control the magnetic field.

As the welding devices discussed above are well known to those skilled in the art, their function and operation will not be further discussed. Of course, depending on the welding operation, the welding system can have some or all of the welding devices discussed above and/or include other welding devices. In addition, although a welding device's power supply is illustrated as a separate device, the welding device, its power supply (including the controller) can be integrated (or several devices may be integrated) into one device. Similarly, although each device's controller is shown as integrated into the respective power supply, the controllers can be stand-alone devices.

In addition, as indicated above, two or more welding controllers can communicate to share information, e.g., feedback information such as arc voltage, welding current, heating current, wire feed speed, travel speed, etc. for monitoring and control purposes. Accordingly, to share this information, the controllers of each welding device can be configured to communicate over a high-speed communication channel 205, which can be a wired system, a wireless system, or a combination of both. The high-speed communications channel 205 can be, e.g., Controller Area Network (CAN), Ethernet, DeviceNet, Process Field Bus (Profibus), etc. By communicating over high-speed channel 205, the welding device controllers can share monitoring and control information in real time (or near real time). For example, the high-speed communication channel 205 can transmit sensor data such as arc voltage V, welding current $I_W$, heating current $I_H$, wire speed, travel speed, etc. and control data such as start/stop commands between the welding devices. Thus, the high-speed communication channel 205 allows for the welding operation to be coordinated among the various welding devices. In some embodiments, the high-speed communication channel 205 can also use protocols such as USB, IEEE 1394 (Firewire), etc. In addition, the high-speed communications channel 205 and communications channel 240 (see FIG. 2) can be incorporated as one communication channel in some exemplary embodiments of the present invention. Thus, the welding monitoring and control discussed above can be incorporated into communication channel 240, which is discussed further below. It should be noted that these communication channels can reside on one or more physical buses.

As an example of welding monitoring and control, the welding power supply controller 174 can monitor the arc voltage V from electrode 172 and transmit the value to the AVC controller 194, which can then use the arc voltage V to adjust the arc length using motor 192. This avoids the need for AVC power supply 190 to have its own arc voltage sensor. In addition, by sharing the value for arc voltage instead of each controller having its own arc voltage value, the two controllers can avoid a situation where the controllers fight each other because the two arc voltage values are different. Similarly, the hot wire controller 164 can receive wire feed speed information from wire feeder controller 154 to appropriately adjust the heating current. However, in order for a welding device to communicate with a second welding device, it must be loaded with the second welding device's drivers and/or application software. As discussed further below, exemplary embodiments of the present invention help ensure that the device drivers and/or application software used by the welding devices are loaded and up-to-date.

Figure 2:
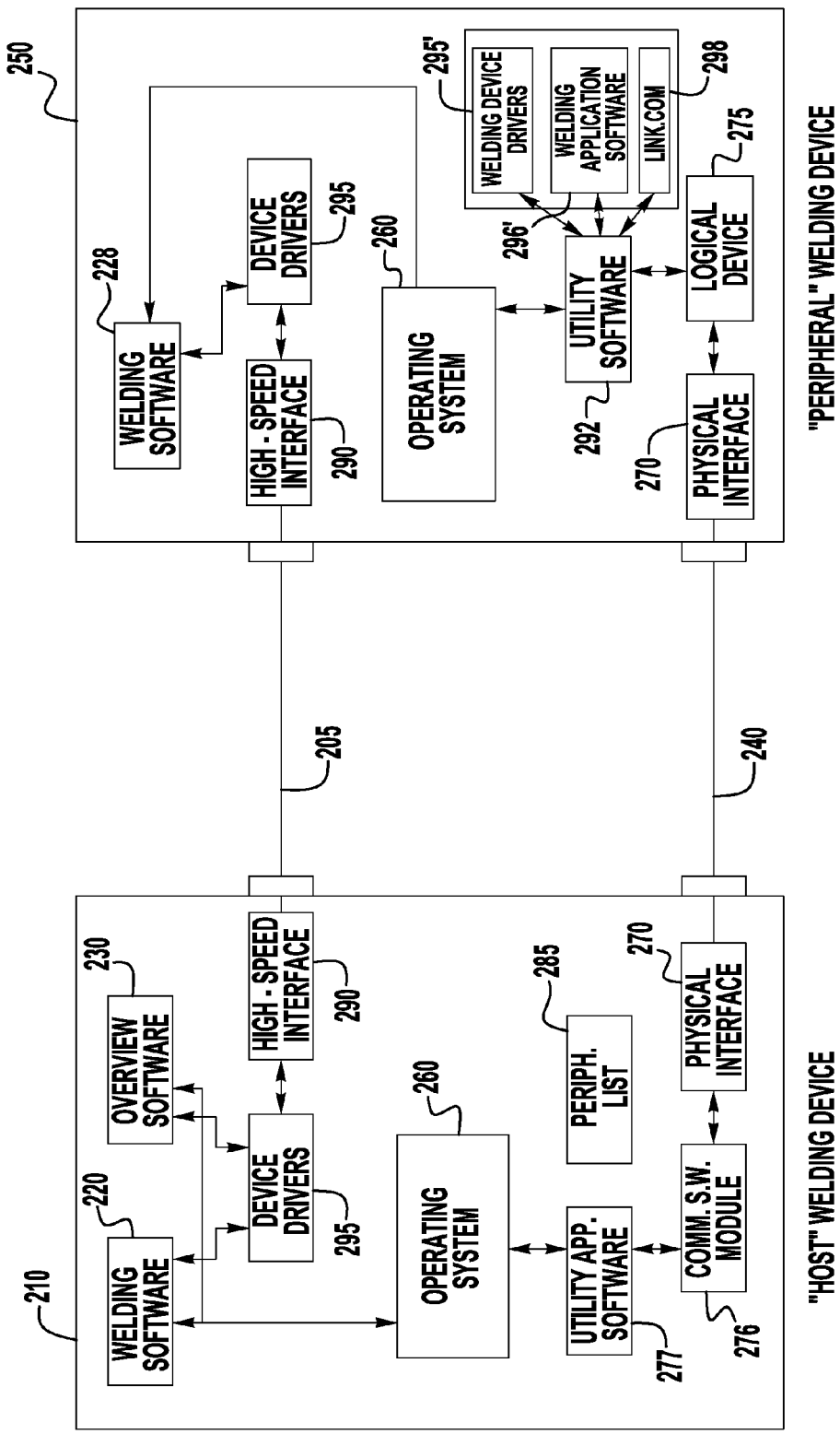
FIG. 2 illustrates an exemplary "Host" welding device and an exemplary "Peripheral" welding device that are consistent with the present invention.

FIG. 2 illustrates a simple embodiment in which two welding devices are connected to each other. These welding devices can be any of the welding devices discussed above or some other welding device. Welding device 210 can have welding application software 220, for monitoring and controlling its functions. In addition, in some embodiments, one or more welding devices can have overview software 230 that can monitor and control the overall welding operation. That is, in addition to its own functions using welding software 220, the welding device 210 can also have the capability of monitoring and controlling the operation of other welding devices using overview software 230. For example, in some embodiments, welding device 210 can be a welding power supply similar to welding power supply 170 and include software 220 that monitors and/or controls the welding current $I_W$ and overview software 230 that monitors and/or controls the other welding devices via communication channel 205 or 240. Of course, the overview software 230 can be located in another welding device or in a separate device such as monitoring and control device 195. A separate monitoring and control device 195 can be located locally where the welding operation is taking place or remotely, e.g., in a central control room, another facility, etc. An example of monitoring and control software that can be incorporated in the present invention is found in U.S. Pat. No. 6,002,104, which is incorporated herein in its entirety as background material. The monitoring and control device 195 can be any type of computer device such as e.g., a PC, workstation, digital tablet, cell phone, etc. In addition, the communication between monitoring and control device 195 and the other welding devices can be wired or wireless.

Turning back to FIG. 2, the welding application software 220 in each of the welding devices needs to be compatible if information is to be shared, e.g., with the application software 220 in other welding devices and/or with application software 230. Accordingly, a method of loading and updating welding device drivers and welding application software that minimizes operator interaction is needed. It should be noted that, although the welding application software in each welding device is designated as "220," the actual software can be device specific. For example, the welding software 220 for an AVC welding device can relate to arc voltage control, whereas the welding application software 220 for a magnetic field welding device can relate to controlling a magnetic field.

As illustrated in FIG. 2, a welding device 210 consistent with exemplary embodiments of the present invention can include a standard operating system 260 such as, e.g., Windows, Unix, MAC, Linux, etc. The welding device 210 can also include a second communications channel 240 that conforms to computer industry standards and is compatible with operating system 260, e.g., channel 240 can conform to a standard such as USB, IEEE 1394 (Firewire), etc. For purposes of clarity, welding monitoring and control communications and operating system communications will be discussed with respect to an exemplary embodiment in which these communications occur over two separate channels, e.g., channel 205 and channel 240 as illustrated in FIG. 2. Of course, as discussed above, these channels can reside on one or more physical buses. In addition, the channels 205 and 240 can be implemented as a single channel system. In other embodiments, the present invention can include more than two communication channels. The operating systems 260 can be the same or different across the welding devices as long as a "host" welding device on communications channel 240 can read the files of a "peripheral" welding device as discussed below. Software on the welding devices such as welding application software 220 and overview software 230 can run on the operating system 260.

In some embodiments, one of the welding devices can act as a default "host" welding device with respect to functions related to the operating system 260, e.g., functions such as managing the device drivers and the application software for the welding devices. For example, welding device 210 can act as a default "host" welding device under standard protocols, e.g., protocols such as USB, IEEE 1394 (Firewire), etc., to handle host related functions, including maintaining a peripheral list 285. The "host" welding device 210 can be, e.g., the welding power supply 170 or any other welding device. The "host" welding device 210 includes a physical bus interface 270 that connects to a physical bus on which the communication channel 240 resides. The physical bus interface 270 is configured to handle the information flow over communications channel 240. For example, in the case of USB, the physical bus interface 270 can be a USB Interface, which is configured to act as a USB host controller. Data transmissions on communications channel 240 can be in the form of data packets, which are managed by communication software module 276. The "host" welding device 210 can also include utility application software 277, which handles the communications between operating system 260 and other welding devices on communication channel 240. For example, utility application software 277 can handle communications related to uploading device drivers and software from other welding devices. These communications can be packetized by communication software module 276 and sent to physical channel interface 270 for transmission over the communication channel 240 to the appropriate "peripheral" welding device. Of course, communication software module 276 can also retrieve the information found in data packets transmitted to the "host" welding device 210 from the "peripheral" welding devices. After retrieving the information from the data packets, communication software module 276 sends the information to appropriate software application, e.g., utility application software 277. For example, utility application software 277 can request and receive welding device drivers 295' and welding application software 296' from "peripheral" welding device 250. Welding device drivers 295' can be loaded into "host" welding device 210 as device drivers 295 (or updates to device drivers 295) in order to permit "host" welding device 210 applications such as welding application software 220 and overview software 230 to communicate with welding application software 220 of "peripheral" welding device 250 over the high-speed communication channel 205 via high-speed channel interface 290. Welding application software 296', when loaded, can be, for example, overview software 230, a component of overview software 230, or some other software application on "host" welding device 210. Once loaded or updated, the overview software 230 or some other application can monitor and/or control "peripheral" welding device 250.

The "peripheral" welding device 250 can be, e.g., any of the welding devices discussed above or another device. Accordingly, the device drivers 295' and application software 296' can be device specific. That is, the device drivers 295' and application software 296' for an AVC welding device 194 can be different from the device drivers 295' and application software 296' for a magnetic field welding device 130. Similar to the "host" welding device 210, each "peripheral" welding device 250 has a physical interface 270 that connects to communication channel 240. In the case where the communication channel is USB, the physical interface 270 is a USB Interface. Communications flow in the peripheral devices is managed by logical device 275 in accordance with the appropriate protocol, e.g., USB, IEEE 1394 (Firewire), etc. By default, logical device 275 emulates one of the devices on the peripheral list 285 on "host" welding device 210 so that, e.g., the utility application software 277 can communicate with "peripheral" welding device 250. In some embodiments, the peripheral list 285 includes standard devices such as CD ROM drives, serial port devices, disk drives, etc. Accordingly, when logical device 275 emulates such a standard peripheral device, applications such as utility application software 277 will see "peripheral" welding device 250 as the standard device, e.g., as a CD ROM, even though a physical CD ROM may not exist on "peripheral" welding device 250. Further, utility application software 277 of the "host" welding device 210 can then use standard protocols found on operating system 260 to upload the welding device drivers 295' and welding software 296' from "peripheral" welding device 250. For example, if the operating system 260 is Windows and logical device 275 is emulating a CD ROM drive, the utility application software 277 can be a standard Windows program that uses the standard Windows CD ROM drivers to communicate with a standard Windows program 292 in "peripheral" welding device 250 in order to upload the welding device drivers 295' and/or the welding application software 296'. Thus, by emulating standard devices and using the device drivers of standard operating systems, the welding device drivers 295' and/or welding application software 296', either of which can be propriety, can be easily uploaded to another welding device.

For example, the "peripheral" welding device 250 can have welding device drivers 295' and/or welding software 296' loaded in a memory 297. Memory 297 is not limiting and can be, e.g., a disk drive, a CD ROM drive, DVD drive, ROM, RAM, etc. In addition, memory 297 can include an Internet link 298 to the latest welding device drivers and software. When a "host" welding device 210 and a "peripheral" welding device 250 are attached using standard communication channel 240, the logical device 275 of "peripheral" welding device 250 can emulate a standard peripheral device, e.g., a CD ROM drive, DVD drive, serial port devices, disk drives, etc. The "host" welding device 210 will sense the attachment of the "peripheral" welding device 250 and run, e.g., utility application software 277 that checks the welding device driver and welding software information on the "peripheral" welding device 250. For example, the checks can include comparing the device drivers and software (e.g., type, revision level, etc.) found on "peripheral" welding device 250 with those found on "host" welding device 210. If the welding drivers 295 and/or an application software, e.g., overview software 230, on the "host" welding device 210 need to be updated based on the checks, utility application software 277 will request that the appropriate welding device drivers 295' and/or software 296' be transferred to the "host" welding device 210 either from the memory 297 or from an Internet link 298 provided by the "peripheral" welding device 250. In some embodiments, if logical device 275 is a CD ROM, the standard "Auto Run" feature of the CD ROM can automatically run application software in either the "host" welding device 210 (e.g., utility application software 277) and/or the "peripheral" welding device 250 to perform the device driver/welding software checks. By storing the device drivers 295', software 296', and/or Internet link 298 on the "peripheral" welding device 250, the device drivers 295 and application software, e.g., overview software 230, of the "host" welding device 210 can be automatically updated with little or no operator intervention after the "peripheral" welding device 250 has been connected to the "host" welding device 210 via standard communication channel 240.

Once the drivers 295 are loaded onto the "host" welding device 210, the "host" welding device 210 will be able to communicate with the "peripheral" welding device 250 on high-speed communication channel 205. For example, as discussed above, in some embodiments, the "host" welding device 210 can be welding power supply 170 with welding controller 174 and the "peripheral" welding device 250 can be an AVC power supply 190 with AVC controller 194. Accordingly, after the device drivers 295 and/or application software, e.g., overview software 230, have been updated on welding power supply 170, the arc voltage V received by welding controller 174 can be transmitted to AVC power supply 190 so that AVC controller 194 can regulate the arc length. In addition, along with monitoring capabilities, welding controller 170 can be configured to start and stop the other welding devices as needed. That is, welding power supply 170 may be configured to stop the other welding devices such as AVC power supply 190 if the welding power supply 170 senses that the arc 110 has been extinguished.

Figure 3:
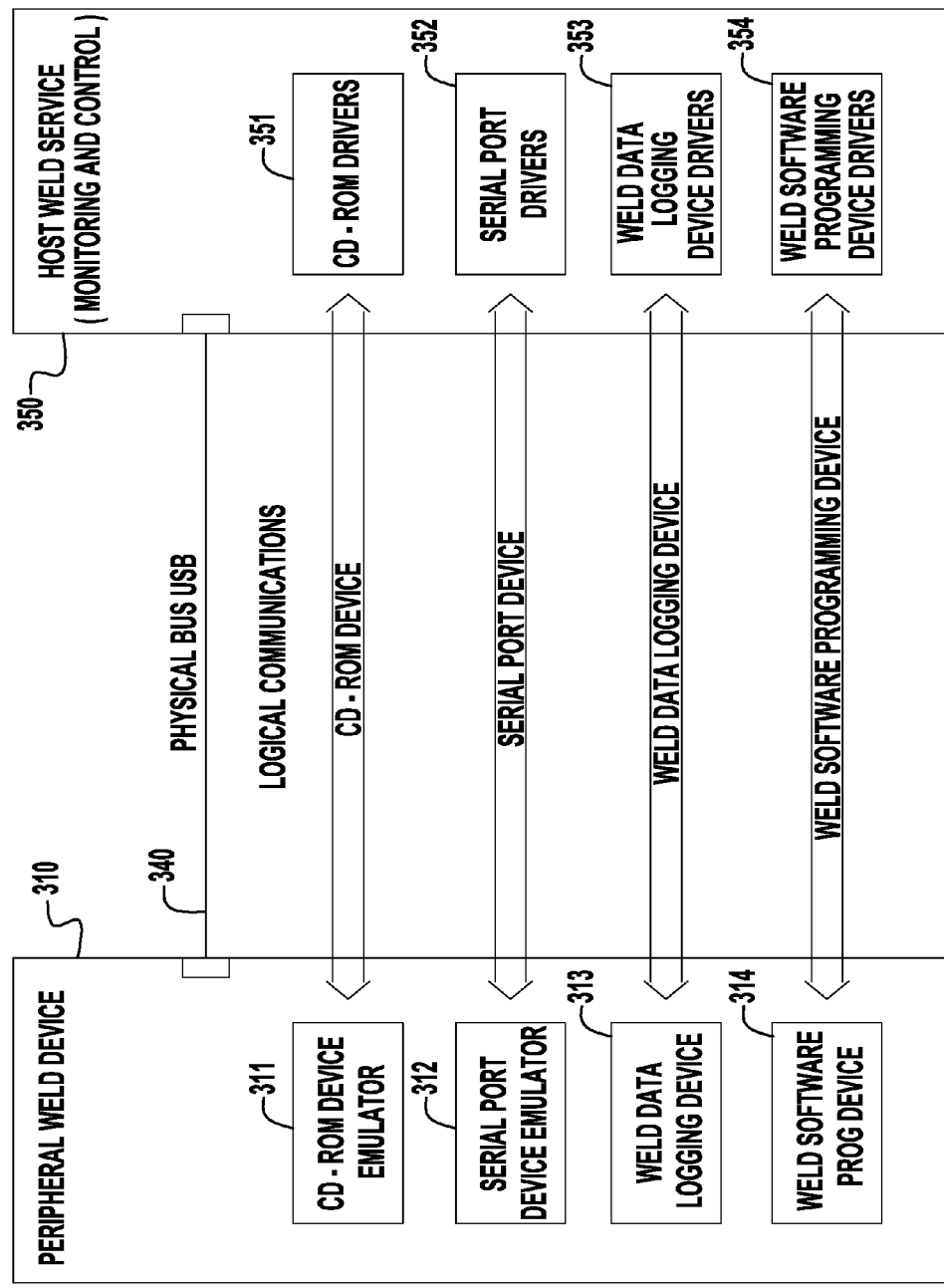
FIG. 3 illustrates an exemplary communications between an exemplary "Host" welding device and an exemplary "Peripheral" welding device that are consistent with the present invention.

In another exemplary embodiment, as illustrated in FIG. 3, a "peripheral" weld device 310 can include weld devices such as, e.g., a weld data logging device 313 and a weld software programming device 314. The weld device 310 can communicate with "host" weld device 350, which can be, e.g., a monitoring and control device (such as a PC, workstation, digital tablet, cell phone, etc.). The "peripheral" weld device 310 and the "host" weld device 350 can have an architecture similar to "peripheral" welding device 250 and "host" welding device 210 discussed above. However, in this exemplary embodiment, the "peripheral" weld device 310 and the "host" weld device 350 communicate over communication channel 340. The communication channel 340 can include features discussed above with respect to communication channels 205 and 240. That is, communication channel 340 can transmit communications related the standard operating system as well as communications related to welding operations. In some embodiments, the communication channel 340 can reside on a USB bus. Weld device 310 can include emulators for standard physical devices, e.g., a CD-ROM 311, a serial port device 312, etc., even though weld device 310 may not include such physical devices. In addition, weld device 310 can include the hardware/firmware/software for weld system devices such as, e.g., weld data logging device 313 and weld software programming device 314. Of course, the weld device 310 can include other weld system devices in addition to or instead of weld data logging device 313 and weld software programming device 314.

In this exemplary embodiment, weld data logging device 313 and weld software programming device 314 allow an operator to monitor and control welding operations at monitoring and control device 350. For example, the monitoring and control device 350 can receive welding data such as, e.g., the current and/or voltage waveforms, via weld data logging device 313 and transmit control instructions such as changes to the welding waveform via weld software programming device 314. Monitoring and controlling of welding operations is known in the art. For example, U.S. Pat. No. 6,002,104 discloses examples of monitoring and control of welding operations that can be incorporated into the present invention. Accordingly, the monitoring and controlling of welding operations will not be further discussed.

As part of the standard operating system, monitoring and control device 350 will include standard device drivers, e.g., CD-ROM drivers 351 and serial port device drivers 352. Such standard device drivers give flexibility in installing the device drivers for weld system devices. For example, the "Auto-Run" feature of the standard CD-ROM can be used to automatically load the device drivers for devices such as the weld data logging device 313 and the weld software programming device 314. When the weld device 310 is connected to monitoring and control device 350, the weld device 310 will initially emulate a CD-ROM device 311 on USB communication channel 340. Thus, monitoring and control device 350 will "see" weld device 310 as a "CD-ROM." The "Auto-Run" feature can then be set-up to automatically (or semi-automatically with operator input) load (or update) the weld data logging device drivers 353 and the weld software programming device drivers 354. The system may also automatically or semi-automatically load application software as needed. Once the drivers and application software are loaded, the monitoring and control device 350 will also be able to communicate with weld system devices such as the weld data logging device 313 and the weld software programming device 314 over communication channel 340. Of course, as discussed above, in some embodiments, the weld device 310 can include information such as, e.g., Internet links so that the device drivers can be retrieved from a remote location such as a website. Thus, anytime a vendor specific device driver is required to communicate with a peripheral device, such as a weld device, the present system allows the weld device to have its unique device drivers (or Internet links to device drivers) with it. Accordingly, the present invention can eliminate the need to distribute device driver software on CDs (or other media) and ensures proper management of driver version to weld equipment version.

In the above exemplary embodiments, welding power supply 170 and monitoring and control device 350 was described as acting as the "host" welding device. However, the present invention is not limited to this configuration and any welding device can act as the "host" welding device. Thus, any welding device (i.e., first welding device) can be uploaded with drivers and software for communicating with a second welding device by simply making the first welding device a "host" and connecting the second welding device to it. To this end, in some embodiments, the welding devices can be configured such that the roles of "host" and "peripheral" can be reversed. The method of reversing the roles is not limiting and can be accomplished by hardware circuits, application software, and/or by the operating system 260. In some embodiments, the roles can be reversed by using features found in the communications protocol. For example, if the communication channel 240 is USB, the roles "host" and "peripheral" can be reversed by using the USB-On-The-Go feature. Thus, by having the ability to configure different welding devices as hosts, the device drivers and software of other welding devices can be easily uploaded on each of these hosts. Accordingly, the flexibility of the welding system is greatly enhanced, as each welding device can easily be configured to communicate with any of the other welding devices.

In summary, while the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A system for installing device drivers or application software on equipment used in one of a brazing, cladding, building up, filling, hard-facing overlaying, joining or welding operation between a workpiece and at least one of an electrode, a filler wire, and a laser, said system comprising:

a communication system including a first communication channel and a second communication channel;

a plurality of devices, each device including a power supply and a controller to monitor and control at least one of a plurality of processes of said one of a brazing, cladding, building up, filling, hard-facing overlaying, joining or welding operation, the plurality of devices including at least:

a first device used in a first process of said plurality of processes of said one of a brazing, cladding, building up, filling, hard-facing overlaying, joining or welding operation, said first device includes a first application software for monitor and control of said first process;

a bus interface coupled to said second communication channel;

a memory for maintaining a peripheral list defining a plurality of standard devices; and a utility application for communication with any one of said plurality of standard devices of said peripheral list;

a second device used in a second process of said plurality of processes of said one of a brazing, cladding, building up, filling, hard-facing overlaying, joining or welding operation, said second device includes a bus interface coupled to said second communication channel; and a memory having stored thereon device software including a device driver and a second application software for monitor and control of said second process of said one of a brazing, cladding, building up, filling, hard-facing overlaying, joining or welding operation, said memory providing for a logical device coupled to said bus interface and defining a communication protocol for said second device over said second communication channel, said logical device emulating one of said plurality of standard devices so that said utility application communicates with said emulated standard device over said second communication channel and said second device transmits said device software or a link to said device software to said first device over said second communication channel for a check of said device software by said utility application so that said first device communicates with said second device over said first communication channel to at least one of monitor and control said second device, said first process being different from said second process, each of said first and second processes including at least one of: (i) monitor and control of an arc between an electrode and said workpiece for creating a weld puddle on said workpiece; (ii) monitor and control of a position of said electrode relative to said weld puddle created on said workpiece; (iii) monitor and control of a filler wire fed to said weld puddle created on said workpiece; (iv) monitor and control of a resistance heating of said filler wire fed to said weld puddle created on said workpiece; (v) monitor and control of a position of at least one of said plurality of devices relative to said workpiece; and (vi) monitor and control of a steering system for steering said arc between said electrode and said workpiece.

2. The system of claim 1, wherein said utility application of said first device requests said device software from said second device after a determination that said device software needs to be uploaded.

3. The system of claim 2, wherein said second communication channel uses a protocol comprising one of USB and IEEE 1394,
wherein said first device emulates a host under said protocol and said logical device emulates a peripheral under said protocol, and
wherein said device software or said link to said device software is transmitted over said second communication channel.

4. The system of claim 3, wherein said first device or said second device automatically performs said determination that said device software needs to be uploaded when said first device and said second device are initially connected.

5. The system of claim 4, wherein said peripheral is a disk drive, a serial port device, DVD drive, or a CD ROM.

6. The system of claim 3,
wherein said communications regarding said at least one of monitor and control are performed over said first communication channel in real time.

7. The system of claim 1, wherein said first and second communication channels define a single bus, and
wherein said communications regarding said at least one of monitor and control and said transmission of said device software or said link to said device software are performed over said single bus.

8. The system of claim 4, wherein said first device comprises a standard operating system and said device software runs on said standard operating system.

9. The system of claim 8, wherein said peripheral is a CD ROM that comprises a program that performs said determination that said device software needs to be uploaded, and
wherein said operating system on said first device comprises a function that starts said program.

10. The system of claim 1, wherein said link is an Internet link.

11. A method for installing device drivers or application software on equipment used in one of a brazing, cladding, building up, filling, hard-facing overlaying, joining or welding operation on a workpiece, said method comprising:
providing a first communication channel and a second communication channel, each of said first and second communication channels being interfaced with a plurality of devices, each device including a power supply and a controller to monitor and control at least one of a plurality of processes of said one of a brazing, cladding, building up, filling, hard-facing overlaying, joining or welding operation, the plurality of devices including at least a first device carrying out a first process of said plurality of said processes of said operation and a second device carrying out a second process of said plurality of said processes of said operation, said first process being different from said second process, each of said first and second processes including at least one of: (i) monitor and control of an arc between an electrode and said workpiece for creating a weld puddle on said workpiece; (ii) monitor and control of a position of said electrode relative to said weld puddle created on said workpiece; (iii) monitor and control of a filler wire fed to said weld puddle created on said workpiece; (iv) monitor and control of a resistance heating of said filler wire fed to said weld puddle created on said workpiece; (v) monitor and control of a position of at least one of said plurality of devices relative to said workpiece; and (vi) monitor and control of a steering system for steering said arc between said electrode and said workpiece;
emulating a standard device on said second device, said standard device being on a peripheral listing of said first device; and
transmitting device software or a link to said device software stored on said second device to said first device over said second communication channel,
said device software is at least one of said device drivers or said application software for monitor and control of said second process in said one of a brazing, cladding, building up, filling, hard-facing overlaying, joining or welding operation; and
checking said device software by said first device for at least one of monitor and control of said second device by said first device.

12. The method of claim 11, further comprising:
determining whether said device software needs to be uploaded to said first device; and
requesting, by said first device, said device software from said second device after a determination that said device software needs to be uploaded.

13. The method of claim 12, further comprising:
using a protocol in said second communication channel that comprises one of USB and IEEE 1394;
emulating a host under said protocol by said first device;
emulating a peripheral under said protocol by said second device.

14. The method of claim 13, wherein said determining whether said device software needs to be uploaded to said first device is done automatically by said first device or said second device when said first device and said second device are initially connected.

15. The method of claim 14, wherein said peripheral is a disk drive, a serial port device, DVD drive, or a CD ROM.

16. The method of claim 13, further comprising performing at least one of monitoring and controlling said operations over said first communication channel.

17. The method of claim 11, wherein said first communication channel and second communication channel define a single bus, and
wherein said performing said at least one of monitoring and controlling of said operations and said transmitting said device software or said link to said device software are done over said bus.

18. The method of claim 14, further comprising running said device software on a standard operating system of said first device.

19. The method of claim 18, wherein emulating said peripheral includes emulating a CD ROM that comprises a program that performs said determination whether said device software needs to be uploaded to said first device, and wherein said operating system on said first device comprises a function that starts said program.

20. The method of claim 11, wherein said transmitting comprises transmitting said link, said link is an Internet link.

* * * * *